(12) United States Patent
Ertel et al.

(10) Patent No.: US 6,422,382 B1
(45) Date of Patent: Jul. 23, 2002

(54) CONVEYOR INCORPORATING A MODULAR FRAME CONSTRUCTION

(75) Inventors: Daniel E. Ertel, Oconomowoc; Scott M. Hall, Franklin; Michael A. Hosch, Oconomowoc, all of WI (US)

(73) Assignee: Dorner Mfg. Corp., Hartland, WI (US)

( * ) Notice: Subject to any disclaimer, the term of this patent is extended or adjusted under 35 U.S.C. 154(b) by 63 days.

(21) Appl. No.: 09/654,137

(22) Filed: Sep. 1, 2000

(51) Int. Cl.[7] ............................................... B65G 21/00
(52) U.S. Cl. ..................................... 198/860.1; 198/841
(58) Field of Search .............................. 198/837, 841, 198/860.1, 861.1

(56) References Cited

U.S. PATENT DOCUMENTS

| | | |
|---|---|---|
| 1,347,121 A | 7/1920 | Rice |
| 1,913,040 A | 6/1933 | Pierson |
| 1,949,817 A | 3/1934 | Stonefield et al. |
| 2,007,910 A | 7/1935 | Stephens |
| 2,190,336 A | 2/1940 | Olson |
| 2,808,924 A | 10/1957 | Wood |
| 2,914,957 A | 12/1959 | Johnson |
| 3,035,685 A | 5/1962 | Raynor |
| 3,118,315 A | 1/1964 | Loosli |
| 3,217,554 A | 11/1965 | Stalker |
| 3,255,858 A | 6/1966 | Reilly |
| 3,519,121 A | 7/1970 | Baldwin et al. |
| 3,718,197 A | 2/1973 | Barten et al. |
| 3,752,298 A | 8/1973 | Wenger |
| 3,878,937 A | 4/1975 | Glaser et al. |
| 3,921,793 A | 11/1975 | Hutchinson et al. |
| 3,923,148 A | 12/1975 | Dorner |
| 4,059,180 A | 11/1977 | Krivec et al. |
| 4,148,386 A | 4/1979 | Bradbury |
| 4,225,036 A | 9/1980 | Michael |
| 4,344,218 A | 8/1982 | Hooper et al. |
| 4,438,617 A | 3/1984 | Ulrich et al. |
| 4,487,309 A | 12/1984 | Dorner |
| 4,685,556 A | 8/1987 | Joseph |
| 4,732,266 A | 3/1988 | Dorner |
| 4,759,434 A | 7/1988 | Dorner |
| 4,993,542 A | 2/1991 | Nomura |
| 5,131,529 A | 7/1992 | Dorner |
| 5,156,260 A | 10/1992 | Dorner et al. |
| 5,156,261 A | 10/1992 | Dorner |
| 5,174,435 A | 12/1992 | Dorner et al. |
| 5,203,447 A | 4/1993 | Ewert |
| 5,265,714 A | 11/1993 | Hansen |
| 5,311,983 A * | 5/1994 | Clopton ............... 198/861.1 X |
| 5,875,883 A | 3/1999 | Ertel et al. |
| 5,984,083 A | 11/1999 | Hosch et al. |
| 6,053,298 A | 4/2000 | Nimmo et al. |
| 6,109,427 A | 8/2000 | Hosch et al. |

FOREIGN PATENT DOCUMENTS

| | | | | |
|---|---|---|---|---|
| DE | 3 728138 | * | 3/1989 | ............... 198/841 |
| EP | 243731 | * | 11/1987 | ............... 198/841 |
| EP | 329832 | * | 8/1989 | ............. 198/860.1 |
| FR | 567473 | | 11/1958 | |
| FR | 2 597451 | * | 10/1987 | ............... 198/841 |
| FR | 2 636052 | * | 3/1998 | ............. 198/861.1 |

* cited by examiner

Primary Examiner—James R. Bidwell
(74) Attorney, Agent, or Firm—Andrus, Sceales, Starke & Sawall, LLP

(57) ABSTRACT

A conveyor construction including a conveyor frame formed from a pair of side frame members interconnected with each other by at least one bed plate. Each side frame member includes a slot-type engagement structure that extends throughout the entire length of the side frame member. The slot-type engagement structure is capable of receiving threaded fasteners such that the bed plate can be selectively positioned along the length of the side frame members. The rotatable spindles mounted to movable head plates at each end of the conveyor frame are secured to internal bearings by an endwise engagement structure.

34 Claims, 8 Drawing Sheets

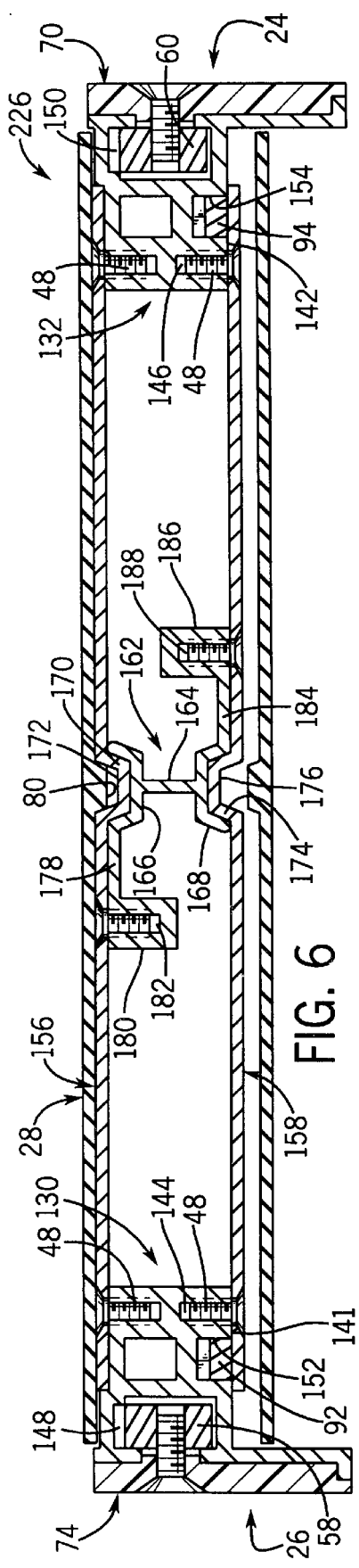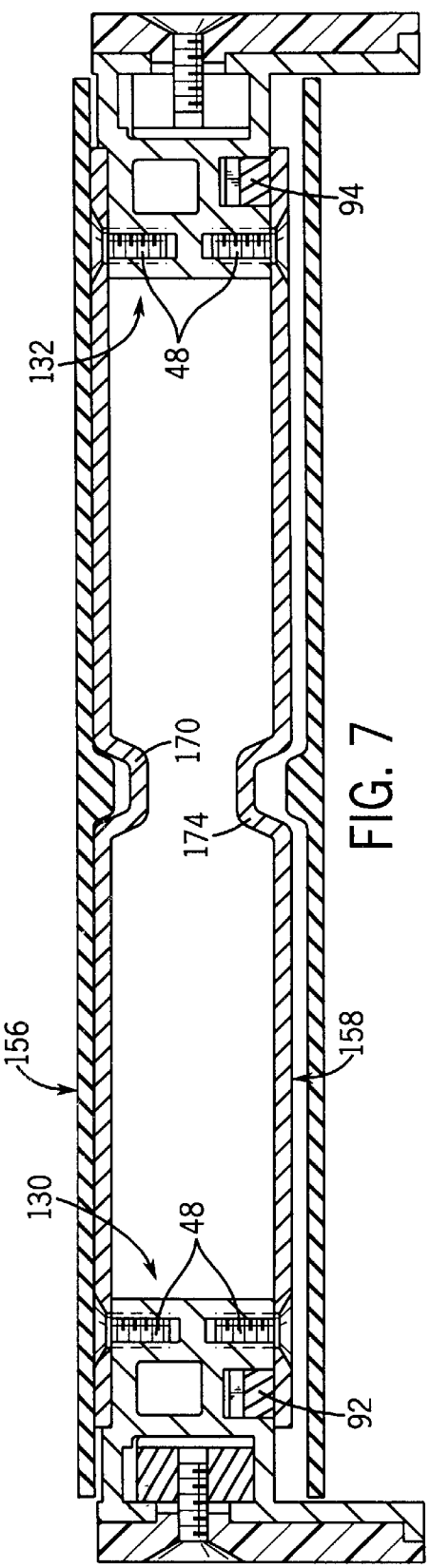

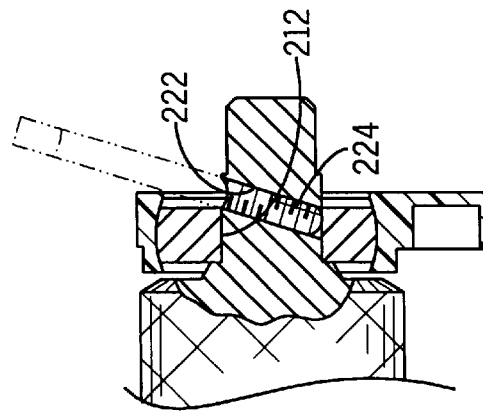
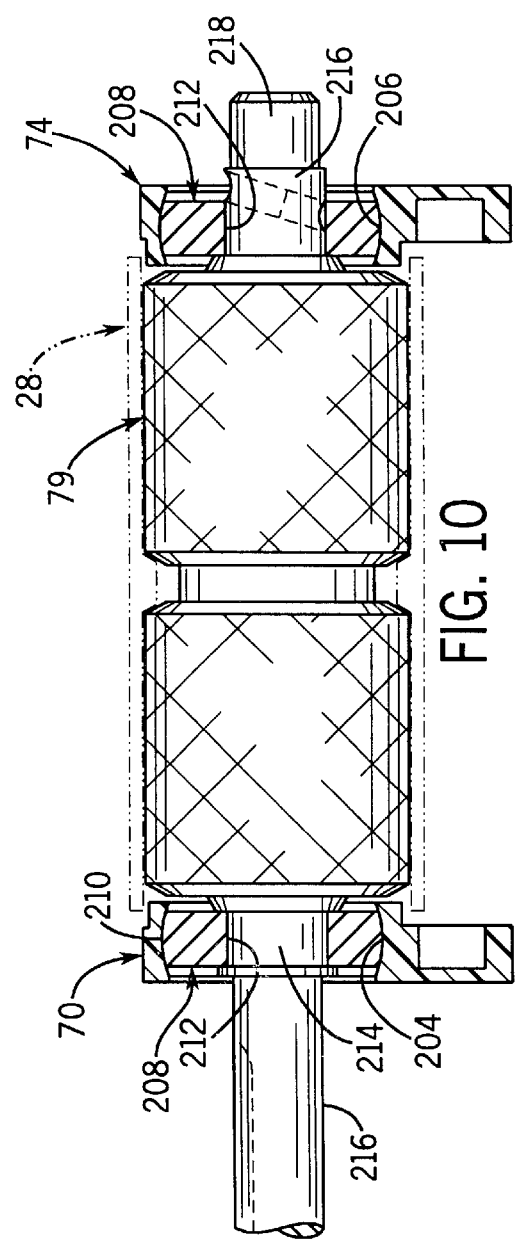

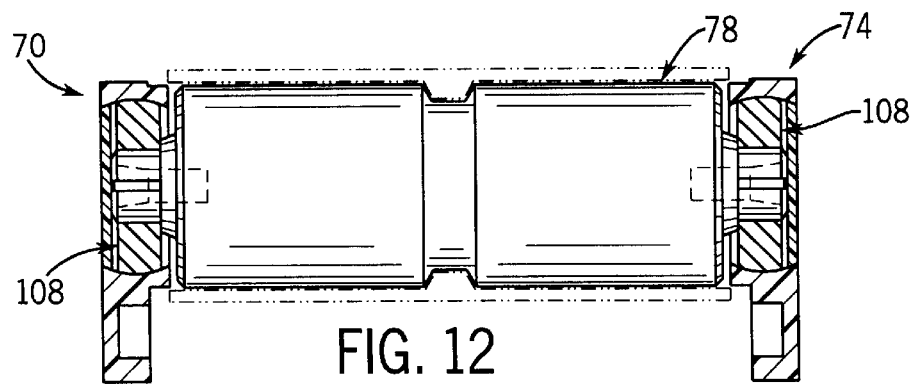
FIG. 12
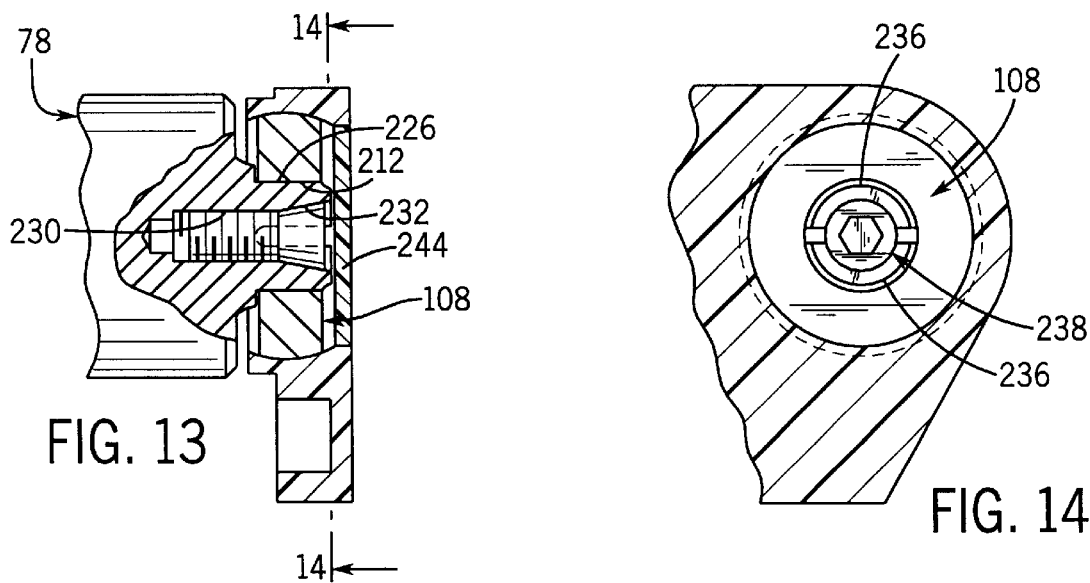
FIG. 13
FIG. 14
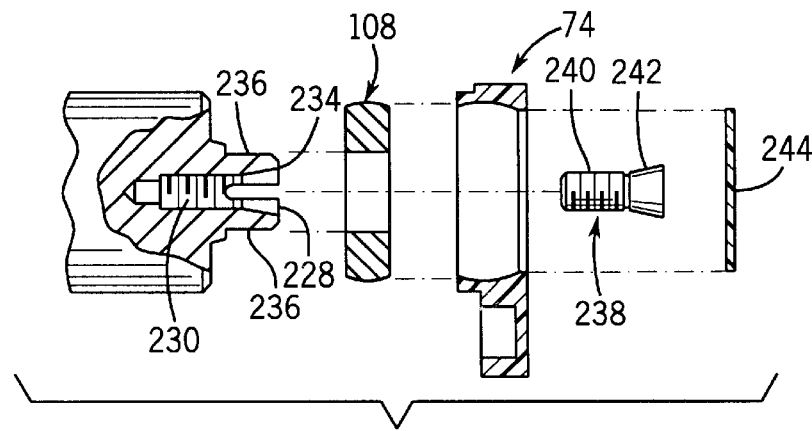
FIG. 15

CONVEYOR INCORPORATING A MODULAR FRAME CONSTRUCTION

BACKGROUND AND SUMMARY OF THE INVENTION

This invention relates to conveyors, and more particularly to an endless belt conveyor having a frame, a pair of spindles and an endless conveyor belt.

Known construction of an endless belt conveyor typically includes a frame assembly, a pair of head plates located at each end of the frame assembly, a spindle extending between each pair of head plates, and a conveyor belt engaged with the spindles. One of the spindles is drivingly interconnected with a motor, for rotating the spindle thereby to impart movement to the endless conveyor belt. The head plates are movably mounted to the frame assembly so as to provide selective adjustment of the position of the spindles, for providing proper belt tensioning and tracking. One such construction is illustrated in Domer et al U.S. Pat. No. 5,174,435, the disclosure of which is hereby incorporated by reference.

In the Domer et al '435 patent, the conveyor frame is a ladder-type construction consisting of a pair of side frame members interconnected together via a series of transversely extending cross members, each of which is connected at its ends to the side frame members. T-shaped slots are formed in the side frame members, and each head plate is movably mounted to one of the side frame members by means of a T-nut slidably received within the T-shaped slot. A rack and pinion subassembly is mounted adjacent each end of the frame assembly, for selectively moving the head plates outwardly and inwardly relative to the frame assembly, and the T-nuts are employed to secure the head plates in position when proper belt tensioning is attained. A cam-type tracking mechanism provides adjustability in the angle of the spindle for providing proper belt tracking.

While this construction has been found to be highly satisfactory for both manufacturing and operational purposes, it involves certain drawbacks in overall part count and in assembly, in that the ladder-type frame construction is essentially a different subassembly for each available length of the conveyor frame assembly. Further, the belt tensioning and tracking components are separate subassemblies which require numerous parts and several assembly steps.

It is an object of the present invention to provide an endless belt conveyor construction which replaces the prior art ladder-type frame construction with a modular box-type frame construction, which lends itself to a reduced number of parts required for manufacturing conveyors of various lengths and which simplifies overall construction of the conveyor. It is a further object of the invention to provide a conveyor frame construction in which common components can be employed to manufacture conveyors of varying lengths in a relatively simple assembly process. It is a further object of the invention to provide such a conveyor construction in which the various components can be incorporated in a low profile arrangement without sacrificing strength of the conveyor frame and while maintaining optimal belt tensioning and tracking capabilities. A still further object of the invention is to provide such a conveyor construction which does not require a separate subassembly for rack and pinion type belt tensioning. Yet another object of the invention is to provide such a conveyor construction having a spindle mounting arrangement which facilitates mounting of the spindle to a bearing assembly which provides rotatable mounting of the spindle to and between the head plates. A still further object of the invention is to provide such a conveyor construction which is relatively simple in its components and assembly, which provides highly satisfactory frame strength, adjustability and operation.

In accordance with the invention, an endless belt conveyor includes a frame assembly having a pair of spaced apart side frame members. A bed plate spans between and is interconnected with the side frame members, for supporting the conveyor belt. In one form, the side frame members are separate from each other and are interconnected opposite the bed plate via a bottom plate interconnected with the side frame members in a manner similar to connection of the bed plate with the side frame members. In another form, the side frame members are formed integrally with a bottom wall spaced below the bed plate and extending between the side frame members.

Each side frame member includes axially extending slot-type engagement structure formed substantially throughout the entire length of the side frame member. The bed plate is formed to overlie an upwardly facing engagement area of each side frame member, and spaced openings are formed in the side portions of the bed plate. The openings are located so as to be in alignment with the slot-type engagement structure, and a connector fastener is adapted to pass through each opening and into engagement with the slot-type engagement structure for mounting the bed plate to the side frame members. The connectors or fasteners are preferably in the form of self-tapping screws, and the slot-type engagement structure is configured so as to provide threaded engagement of the self-tapping screws upon advancement of the screws into the slot-type engagement structure. The slot-type engagement structure is capable of receiving a connector or fastener at any point along its length, such that common side frame members can be employed for any length of the conveyor frame assembly simply by cutting the side frame member to an appropriate length.

For a conveyor frame in which the side frame members are separate from each other, the bottom plate is interconnected with the side frame members in the same manner as connection of the bed plate to the side frame members. In addition, an intermediate rail member is located between the side frame members and engaged with the bed plate and the bottom plate, to impart strength and rigidity to the frame assembly. The intermediate rail member includes top and bottom engagement sections, each of which includes slot-type engagement structure throughout its length. Again, openings are formed in the bed plate and the bottom plate in alignment with the slot-type engagement structure, and connectors or fasteners extend through the openings into engagement with the slot-type engagement structure for securing the bed plate and the bottom plate to the intermediate rail member. The intermediate rail member is cut to length according to the desired length of the conveyor assembly.

Each side frame member includes an axially extending passage within which a gear rack is received and each gear rack is operatively engaged with one of the head plates. A pinion is rotatably mounted to and extends between the side frame members, and is engaged with the gear rack through an opening formed in the side frame member in communication with the passage within the gear rack is received. Rotation of the pinion results in extension or retraction of the gear racks, for extending and retracting the head plate members in unison so as to adjust the position of the spindle mounted to the head plates and thereby to control the tension in the conveyor belt. The pinion is engaged with a pair of bearings which are trapped between the bed plate and either the bottom plate or the bottom wall, to provide rotatable mounting of the pinion to the frame assembly. At least one end of the pinion is provided with engagement structure such as an irregular opening, and the pinion and is in alignment with an opening formed in a wall of the side frame member for providing engagement of a tool within the irregular opening, to enable a user to rotate the pinion to adjust belt tension. Each head plate is movably mounted to one of the side frame members via a selective locking arrangement, such as a T-slot and retainer arrangement, to enable the head plates to be secured in position relative to the frame assembly when the desired belt tension is attained. In a preferred form, the passage structure extends throughout the entire length of the side frame member. The opening, through which the spindle engages the gear rack, is formed in each side frame member after the side frame member has been cut to length. In this manner, common side frame components can be employed for conveyors of varying lengths, simply by cutting the side frame members to length and forming openings in the side frame members at desired locations toward one of the ends of the side frame members.

Belt tracking is preferably provided by forming a rib on the inside surface of the belt, which is received within a groove formed in the bed plate. Each spindle is mounted to a pair of the head plates using a spherical bearing assembly, which provides self-alignment of the spindle relative to the head plates to ensure belt tracking. Each spindle includes a shaft portion located within an aperture defined by inner wall structure associated with the bearing assembly. A passage is formed in the shaft portion, extending along an axis which is non-perpendicular to a longitudinal axis along which the shaft portion extends. An engagement member is received within the passage, and is operable to frictionally engage the shaft portion with the inner wall of the bearing assembly so as to mount the spindle to the bearing assembly. In one form, the passage extends inwardly from an end section of the shaft portion, in a direction substantially parallel to the longitudinal axis of the shaft portion. The end section of the shaft portion is radially expandable, and the engagement member includes a tapered head section which causes radial expansion of the end section upon advancement of the engagement member within the passage. In another form, the passage is oriented at an acute angle relative to the longitudinal axis of the shaft portion, and opens onto oppositely facing surfaces defined by the shaft portion. An entrance to the passage is located outwardly of the bearing assembly, and the engagement member is advance from the entrance through the passage and outwardly of the passage opposite the entrance, into engagement with the inner wall of the bearing, so as to frictionally engage the shaft portion with the inner wall of the bearing.

The various features of the invention can be separately incorporated into a conveyor construction, and each provides certain advantages, such as reduction in the number of components, strength of the conveyor frame, or ease of manufacture, assembly and operation. In a particularly preferred form, the features are employed in combination to provide a conveyor construction which involves significant improvements in components, assembly and operation.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 6 is a section view similar to FIG. 3 and illustrating the conveyor frame assembly as in FIG. 5;

FIG. 7 is a section view similar to FIG. 6, showing an alternative frame assembly embodiment;

FIG. 10 is a section view taken along line 10—10 of FIG. 1, illustrating a first spindle mounting arrangement which is common to the various frame constructions as illustrated in FIGS. 1–7;

FIG. 11 is a view of a portion of the spindle mounting arrangement as illustrated in FIG. 10, with portions broken away;

FIG. 12 is a section view taken along line 12—12 of FIG. 8, illustrating a second spindle mounting arrangement which is common to the various frame constructions as illustrated in FIGS. 1–7;

FIG. 13 is an enlarged view of a portion of the spindle mounting arrangement of FIG. 12, with portions broken away;

FIG. 14 is a partial section view taken along line 14—14 of FIG. 13; and

FIG. 15 is an exploded partial section view illustrating the components of the spindle mounting arrangement of FIGS. 12–14.

DETAILED DESCRIPTION OF THE INVENTION

Figure 1:
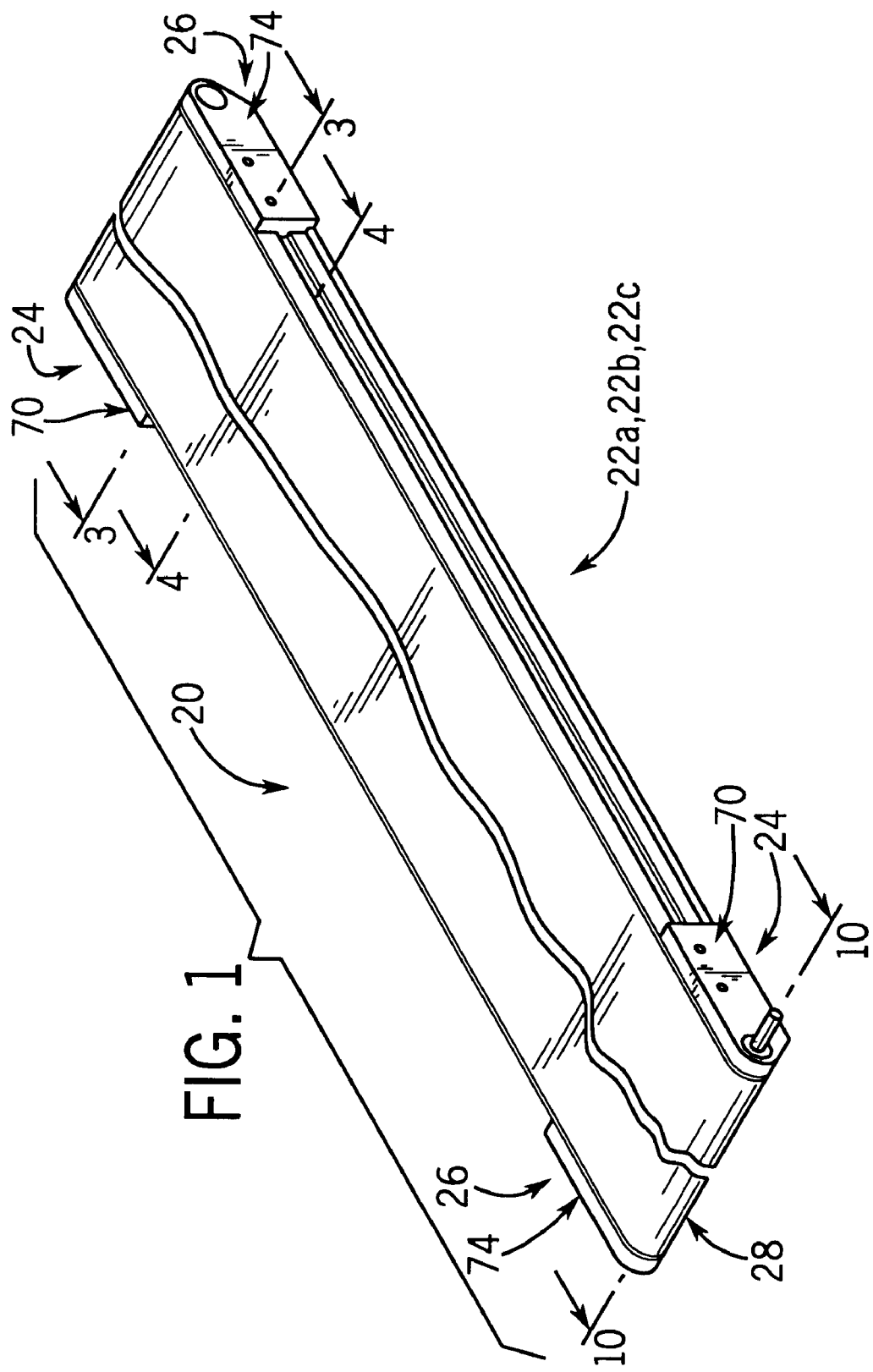
FIG. 1 is an isometric view of a conveyor assembly constructed according to the invention, in which the conveyor assembly is capable of being formed in various lengths and widths.

FIG. 1 illustrates a conveyor assembly 20 constructed according to the invention. Generally, conveyor assembly 20 includes a frame assembly 22a or 22b, a pair of mirror image spindle mounting assemblies 24, 26 mounted to each end of frame assembly 22, a pair of spindles rotatably mounted to and between spindle mounting assemblies 24, 26, in a manner to be explained, and an endless conveyor belt 28 engaged with the spindles and supported by frame assembly 22.

Figure 2:
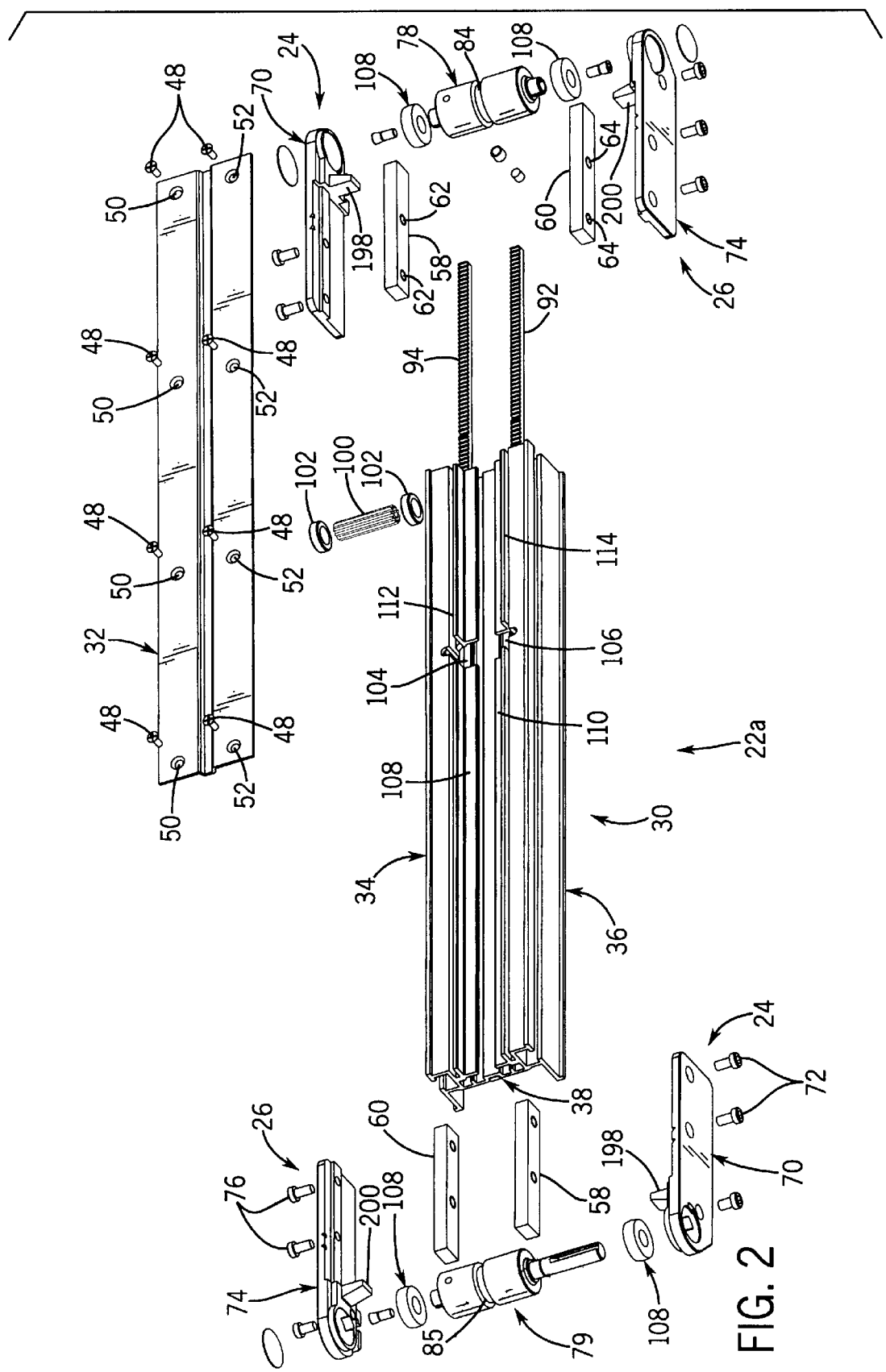
FIG. 2 is an exploded isometric view of one embodiment of a frame assembly for use in the conveyor construction of FIG. 1, in which the conveyor assembly has a relatively narrow width.
Figure 4:
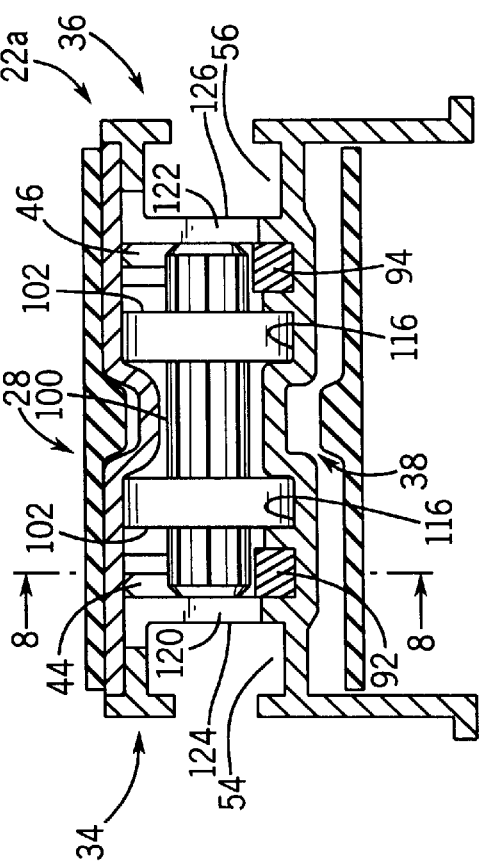
FIG. 4 is a section view taken along line 4—4 of FIG. 1, in a conveyor or assembly incorporating the conveyor frame construction of FIG. 2.
Figure 3:
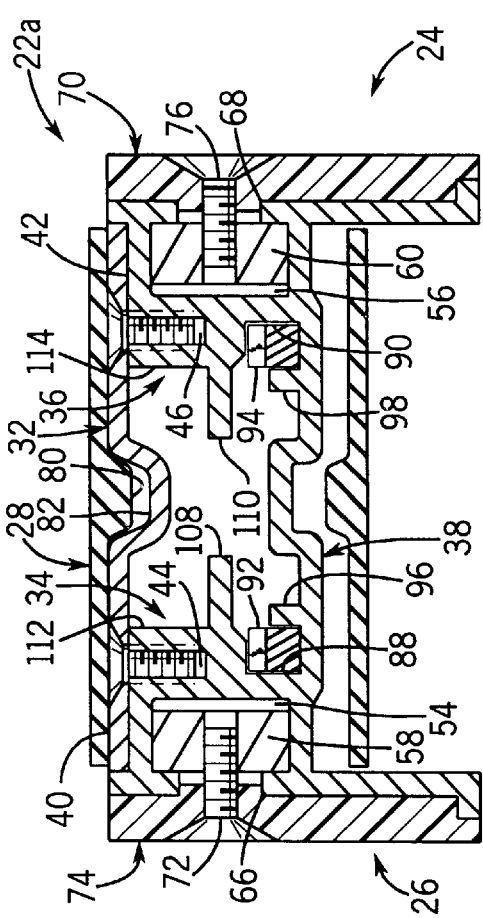
FIG. 3 is a section view taken along line 3—3 of FIG. 1, in a conveyor or assembly incorporating the conveyor frame construction of FIG. 2.

FIGS. 2–4 illustrate frame assembly 22a which is typically employed in a conveyor assembly 20 having a relatively narrow width, such as from three inches to six inches.

Frame assembly 22a includes a frame section 30 and a bed plate 32. Frame section 30 and bed plate 32 have a width according to the desired width of conveyor belt 28, such as in one inch increments between three inches and six inches. The particular configuration illustrated in FIGS. 2–4 is for a three inch conveyor belt 28, and is it is understood that other widths have a similar construction.

Frame section 30 includes a pair of side frame members 34, 36 and an integral bottom wall 38. Side frame members 34, 36 and bottom wall 38 are preferably formed of a lightweight metal such as aluminum in an extrusion process, although it is understood that other materials and forming methods may be employed.

Side frame members 34, 36 define upwardly facing engagement areas 40, 42, respectively, with which side mounting portions of bed plate 32 are engaged. Side frame members 34, 36 include upwardly facing slots 44, 46, respectively, which open onto engagement areas 40, 42, respectively. Slots 44, 46 extend throughout the length of side frame members 34, 36, respectively.

A series of connectors or fasteners, such as self-tapping screws 48, are adapted for engagement with slots 44, 46 through a series of openings formed in bed plate 32. As shown in FIG. 2, one line of openings 50 is formed in bed plate 32 so as to overlie slot 44 in side frame member 34, and another line of openings 52 is formed in bed plate 32 so as to overlie slot 46 formed in side frame member 36.

Slots 44, 46 are capable of engaging a connector or fastener, such as a screw 48, at any point along the length of slot 44, 46. When bed plate 32 is engaged with engagement areas 40, 42 of side frame members 34, 36, respectively as shown in FIG. 3, screws 48 are inserted through openings 50, 52 and advanced into slots 44, 46. The self-tapping feature of screws 48 provides positive threaded engagement of each screw 48 with the walls of side frame members 34, 36 defining slots 44, 46, respectively, so as to securely mount bed plate 32 to side frame members 34, 36.

While the drawings illustrate the engagement structure as being continuous, such as slots 44, 46 throughout the length of side frame members 34, 36, respectively, it is understood that the engagement structure may be discontinuous, such as formed by a series of closely spaced openings or closely spaced slot sections. In such an embodiment, the openings such as 50, 52 may be elongated to provide alignment with the spaced openings or slots in the side frame members.

Side frame members 34, 36 further include outwardly facing T-shaped channels or slots 54, 56, respectively, which define outwardly open passages within which slide or retainer members 58, 60, respectively, are located. Retainer members 58, 60 include threaded openings 62, 64, respectively, which are accessible through the outwardly open entrances to T-slots 54, 56, shown at 66, 68, respectively. Spindle mounting assembly 24 (FIGS. 2, 3) further includes a head plate 70 engaged with retainer member 58 through a pair of screws 76 received within openings 62, and spindle mounting assembly 26 includes a head plate 74 engaged with retainer member 60 through a pair of screws 72 received within openings 64. An idler spindle 78 is rotatably mounted between spindle mounting assemblies 24, 26 at one end of conveyor assembly 20 and a drive spindle 79 is rotatably mounted between spindle mounting assemblies 24, 26 at the opposite end of conveyor or assembly 20, in a manner to be explained.

The underside of conveyor belt 28 includes a rib 80, and bed plate 32 is formed with a groove 82 within which rib 80 is received. Spindles 78, 79 include grooves 84, 85, respectively, in alignment with bed plate groove 82, for receiving rib 80.

Side frame members 34, 36 further include a pair of passages 88, 90, respectively. A pair of gear racks 92, 94 are slidably received within passages 88, 90, respectively, for axial movement therewithin. Passage 88 is defined by a series of inwardly facing walls defined by side frame member 34 in combination with bottom wall 38. Likewise, passage 90 is formed by a series of inwardly facing walls defined by side frame member 36 in combination with bottom wall 38. Bottom wall 38 includes upwardly extending ribs 96, 98 which cooperate to form passage 88, 90, respectively, and to retain gear racks 92, 94, respectively therewithin.

A transversely extending pinion 100 (FIGS. 2, 4) is rotatably mounted to frame section 30. Pinion 100 has outwardly extending gear teeth formed about is periphery throughout its length, and extends through apertures defined by a pair of bearings 102.

Referring to FIG. 2, openings 104, 106 are formed in side frame members 34, 36, respectively. Openings 104, 106 are formed in horizontal, inwardly extending webs 108, 110 defined by side frame members 34, 36, respectively, and in upwardly extending inner walls 112, 114 which form the inner surfaces of slots 44, 46, respectively. Bearings 102 are received between spaced edges of horizontal webs 108, 110 formed by opening 104, 106, respectively, such that the edges of webs 108, 110 restrain bearings 102 against axial movement. In addition, the vertical spacing between bed plate 32 and lower wall 38 corresponds to the height of bearings 102, such that bearings 102 are captured between bed plate 32 and lower wall 38. Lower wall 38 includes a pair of grooves 116 within which the lower regions of bearings 116 are received, which maintain bearings 102 in an upright attitude. With this construction, bearings 102 are stationarily captured in place within the interior of frame assembly 22. Bearings 102 thus function to rotatably mount pinion 100 to frame assembly 102.

Openings 104, 106 are formed in side frame members 34, 36, respectively, such that the material of side frame members 34, 36 is removed above passages 88, 90, respectively, to establish communication of openings 104, 106 with passages 88, 90, respectively. In this manner, the portions of gear racks 92, 94 in alignment with openings 104, 106, respectively are exposed, so as to enable the gear teeth of pinion 100 to engage the teeth of gear racks 92, 94.

Figure 8:
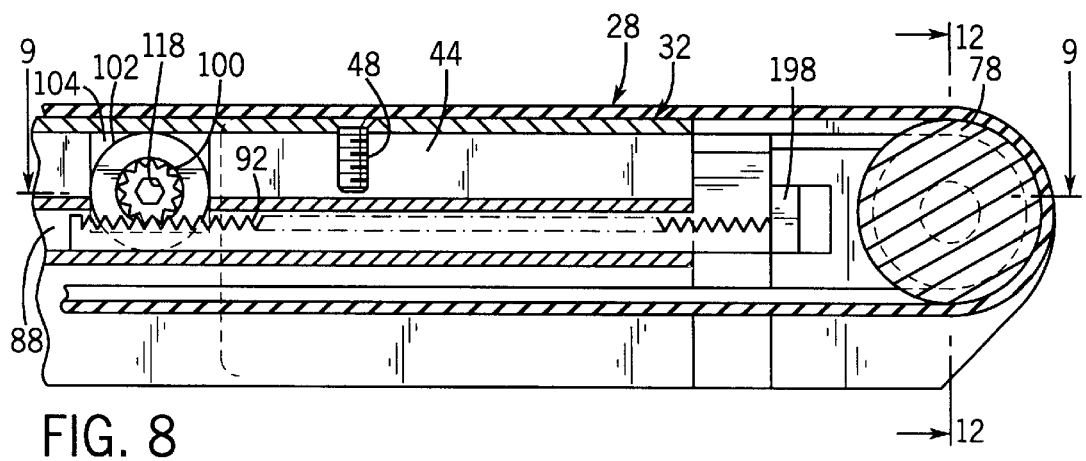
FIG. 8 is a partial section view taken along line 8—8 of FIG. 4, illustrating a head plate mounting and adjustment system which is common to the various conveyor frame constructions as illustrated in FIGS. 1–7.

Referring to FIG. 8, each end of pinion 100 has an irregular opening 118 which is adapted to receive the end of a tool, such as an allen wrench, having a corresponding configuration. Each opening 104, 106 includes a vertical slot 120, 122, respectively, formed in an outer wall 124, 126 defined by side frame members 34, 36, respectively, which cooperate with walls 112, 114 to form slots 44, 46, respectively. Slots 120, 122 allow insertion of the tip of a tool, such as an allen wrench, into opening 118 for imparting rotation to pinion 100.

Figure 5:
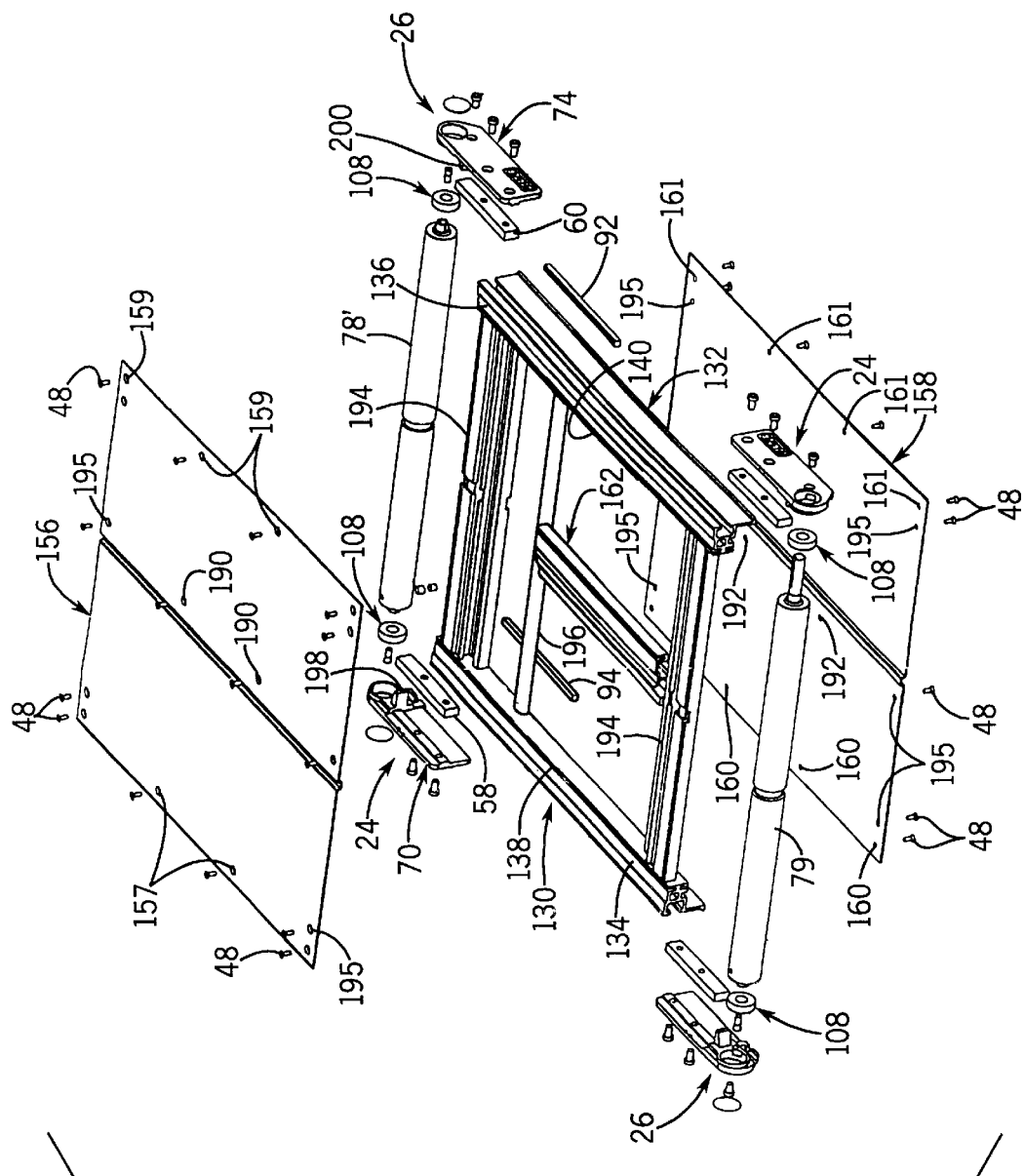
FIG. 5 is an exploded isometric view of another embodiment of a conveyor frame assembly for use in the conveyor construction of FIG. 1, which is utilized in conveyor constructions of greater widths than the frame assembly of FIGS. 2–4.

FIGS. 5 and 6 illustrate a frame assembly 22b which is adapted for use with a conveyor assembly 20 having a width exceeding a predetermined width, such as six inches. Representatively, a frame assembly 22b may can be constructed in incremental widths, such as in three inch increments between eighteen inches and twenty-four inches wide, although it is understood that other widths and incremental variations may be employed. With other modifications, as will be explained, frame assembly 22b is also constructed in incremental widths between eight inches and eighteen inches.

Frame assembly 22b includes separate mirror-image side frame members 130, 132. Side frame members 130, 132 are preferably formed of a lightweight metallic material such as aluminum in an extrusion process, although again it is understood that other satisfactory materials and forming methods may be employed. Side frame members 130, 132 include upwardly facing engagement areas 134, 136, respectively, within which engagement slots 138, 140, respectively, are formed. Slots 138, 140 have the same configuration and purpose as slots 44, 46, respectively, as described previously with respect to side frame members 34, 36, respectively. In addition, side frame members 130, 132 include downwardly facing engagement areas 141, 142, respectively, within which upwardly extending slots 144, 146, respectively, are formed. Slots 144, 146 have a similar configuration and purpose as slots 138, 140, respectively, and all of slots 138, 140, 144 and 146 extend throughout the length of side frame members 130, 132, respectively.

Side frame members 130, 132 have outwardly open T-slots 148, 150, which have the same configuration and purpose as T-slots 54, 56 described previously with respect to side frame members 34, 36, respectively. T-slots 148, 150 receive retainer members 58, 60, respectively, in the same manner as described previously, for securing head plates 70, 74 to side frame members 130, 132, respectively.

Side frame members 130, 132 include downwardly open channels 152, 154, within which gear racks 92, 94, respectively, are received for sliding axial movement.

In frame assembly 22b, an upper bed plate 156 is engaged with upper engagement areas 134, 136 and secured thereto in the same manner as described previously with respect to mounting of bed plate 32. That is, self-tapping screws 48 are inserted through openings 157, 159 formed in the side mounting portions of bed plate 156 in alignment with slots 138, 140, respectively, and screws 48 are advanced into slots 138, 140 so as to securely mount upper bed plate 156 to and between side frame members 130, 132. In a similar manner, a lower plate 158 extends transversely between side frame members 130, 132 and overlies downwardly facing engagement areas 142, 144. As shown in FIG. 5, lower plate 158 includes openings 160, 161 in alignment with slots 144, 146, respectively, and self-tapping screws 48 are inserted through openings 160, 161 and into slots 144, 146 in the same manner as described previously, for securely mounting lower plate 158 to and between side frame members 130, 132.

The outerside portions of lower plate 158 engaged downwardly facing engagement areas 141, 142 of side frame members 130, 132, respectively, on either side of channels 152, 154, respectively. In this manner, the outer side portions of lower plate 158 enclose channels 152, 154, such that gear racks 92, 94 are supported by lower plate 158.

An intermediate center rail 162 is located between and engaged with upper plate 156 and lower plate 158. Intermediate rail 162 includes a vertical web 164 located between upwardly and downwardly facing trough sections 166, 168, respectively. Upwardly facing trough section 166 is adapted to engage channel structure 170 formed in upper bed plate 156 which defines a groove 172 within which conveyor belt rib 80 is received. Similarly, downwardly facing trough section 168 engages channel structure 174 formed in lower plate 158, which receives conveyor belt rib 80. An upper lateral extension 178 extends from upper trough section 166, and a channel section 180 is located at the outer end of lateral extension 178. Channel section 180 defines an upwardly open vertical slot 182 configured similarly to slots 138, 140. Likewise, a lower lateral extension 184 extends from lower trough section 168, and includes a channel section 186 at its outer end. Channel section 186 defines a downwardly facing vertical slot 188 having a configuration like that of slots 138, 140. Openings 190, 192 are formed in bed plate 156 and lower plate 158, respectively. Openings 190 are in alignment with slot 182 and openings 192 are in alignment with slot 188, and screws 48 are inserted through openings 190, 192 into engagement with slots 182, 188, respectively, to rigidly secure intermediate rail 162 between bed plate 156 and lower plate 158. Intermediate rail 162 provides support for bed plate 156 and loads transported on conveyor belt 28, and also imparts rigidity to frame assembly 22b.

A structural adhesive may be interposed between the facing surfaces of upper and lower trough sections 166, 168 and channel structures 170, 174, respectively, in order to increase the strength of frame assembly 22b. The structural adhesive may be employed with intermediate rail 164 having a configuration as shown, or may be used with a modified intermediate rail in which lateral extensions 178, 184 and channel sections 180, 186 are eliminated. In the latter version, screws 48 are not required in order to connect bed plate 156 and lower plate 158 to the intermediate rail.

The above construction of conveyor frame assembly 22b is employed for intermediate width conveyors, such as those having a width between eight and eighteen inches. For wider width conveyors, such as those between eighteen and twenty-four inches (or more), a pair of end cross-members 194 are secured between the ends of side frame members 130, 132. End cross-members 194 have the same cross-section as intermediate rail 162, and are cut from the same extrusion as intermediate rail 162. Openings 195 are formed in top bed plate 156 and in lower plate 158, and screws 48 extend through openings 195 into slots 182, 188 of end cross-members 194 for securing bed plate 156 and lower plate 158 to end cross-members 194. At channel structure 172, 174, recesses are milled into cross-members 194 to provide clearance as needed. End cross-members 194 impart rigidity and stiffness to frame assembly 22b.

Counterbores extend outwardly from the inner walls of side frame members 130, 132, into communication with channels 152, 154, respectively, for exposing a portion of gear racks 92, 94, respectively. A pinion 196 is rotatably mounted within the counterbores, and the teeth of pinion 196 is engaged with the exposed gear rack teeth. A hole is formed in the vertical inner wall of each T-slot 148, 150 in alignment with the end of pinion 196. In this manner, the user can insert a tool, such as an allen wrench, through the hole and into engagement with the pinion opening, such as 118.

FIG. 7 illustrates an alternative frame assembly embodiment 22c, in which intermediate rail 164 is eliminated. In this embodiment, side frame members 130, 132, bed plate 156 and lower plate 158 are interconnected together in the same manner as shown and described with respect to FIGS. 5 and 6. Frame assembly 22c is adapted for use in applications in which the support and strength imparted by intermediate rail 164 are not required. Alternatively, it is understood that the properties, materials and sizes of side frame members 130, 132, bed plate 156 and lower plate 158 may be modified to impart sufficient support and strength characteristics to frame assembly 22c to compensate for the absence of intermediate rail 164.

As shown in FIGS. 2, 5, 8 and 9, head plates 70, 74 include inwardly extending engagement ears 198, 200, respectively. Ears 198, 200 extend inwardly so as to be in alignment with the ends of gear racks 92, 94, respectively. In this manner, engagement of the ends of gear racks 92, 94 with ears 198, 200 respectively, provides outward movement of head plates 70, 74 upon extension of gear racks 92, 94 by operation of the pinion is such as 100 or 196. Retraction of gear racks 92, 94 disengages the ends of gear racks 92, 94 from ears 198, 200, respectively, so as to allow head plate 70, 74 to be moved inwardly to relieve tension on belt 28.

Figure 9:
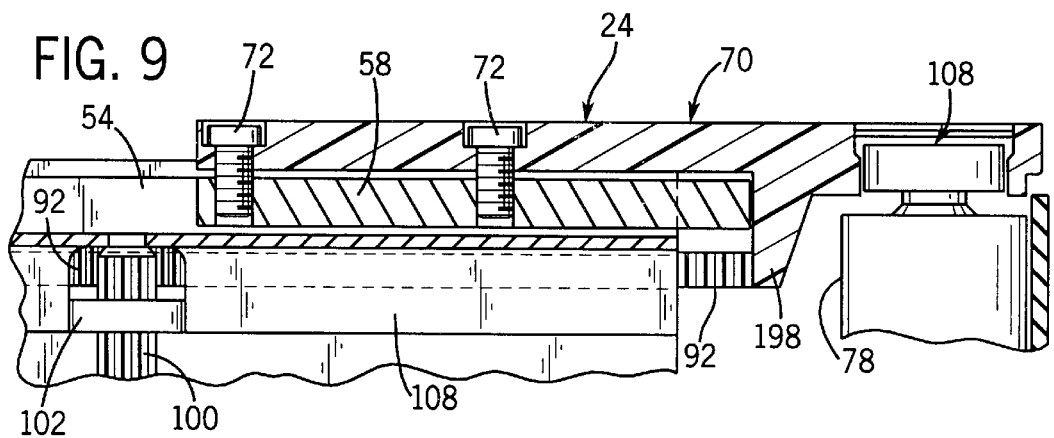
FIG. 9 is a partial section view taken along line 9—9 of FIG. 8.

FIGS. 9 and 10 illustrate an arrangement by which a drive spindle such as 79 is interconnected between spindle mounting assemblies 24, 26, which include head plates 70, 74, respectively. As shown in FIGS. 10 and 11, head plates 70, 74 include spherical apertures 204, 206, respectively, within which conventional spherical bearing assemblies 208 are received. In a manner as is known, each spherical bearing assembly 208 includes a spherical outer surface 210 having a radius corresponding to that of apertures 204, 206, and an inner aperture or passage 212. At one end, spindle 79 includes a bearing engagement shoulder section 214 which extends through bearing aperture 212. A drive shaft 216 extends from shoulder section 214, and is adapted for engagement with a motor, in a manner as is known, for imparting rotation to drive spindle 79 so as to move conveyor belt 28. At the opposite end, drive spindle 79 includes a shaft portion including a shoulder section 216 and an extension 218. Shoulder section 216 is received within bearing aperture 212, and extension 218 is adapted for interconnection with an adjacent conveyor assembly or other known devices.

Shaft portion shoulder section 216 is positively engaged with bearing assembly 208 so as to prevent lateral movement of spindle 79 relative to the conveyor frame, such as 22a or 22b. To provide such positive engagement, an angled threaded passage 222 is formed in shoulder section 216. Passage 222 extends along an axis non-perpendicular to the longitudinal axis of shoulder section 216 and extension 218. As illustrated, the axis of passage 222 is oriented at an acute angle relative to the longitudinal axis of shoulder section 216 and extension 218. With this construction, when shoulder section 216 is received within bearing aperture 212, the entrance to passage 222 is located outwardly of the outer surface of bearing 208. The opposite end of passage 222, which opens onto the surface of shoulder section 216 opposite the entrance, overlaps the inner surface of bearing assembly 208 which defines aperture 212.

A threaded engagement member, such as a set screw 224, is threadedly engaged within passage 222. When shoulder section 216 is engaged with bearing assembly 208 as illustrated, set screw 224 is screwed into passage 222 through the entrance to passage 222, and is advanced through passage 222 such that the end of set screw 224 engages the inner surface of bearing assembly 208 defining aperture 212. Continued advancement of set screw 224 in this manner frictionally engages bearing shoulder section 212 with the surface of bearing assembly 208 defining aperture 212, for preventing lateral movement of spindle 79 relative to head plates 70 and 74, and thereby relative to the frame assembly, such as 22a, 22b.

FIGS. 12–15 illustrate another bearing mounting arrangement for securing a spindle, such as idler spindle 78, between head plates 70, 74. In this embodiment, each end of spindle 78 is provided with an expandable end section 226 located within bearing aperture 212. End section 226 terminates in an outer end surface 228, and a passage extends inwardly from end surface 228. The passage includes a threaded inner section 230 and a flared outer section 232. Transverse slots 234 are formed in outer end section 226, to define a split ring-type construction for expandable end section 226, having a pair of separable flange sections 236.

An engagement member, in the form of a screw 238 having a threaded inner section 240 and an outwardly flared or outer section 242, is adapted for engagement within the passage in end section 226. Threaded inner section 240 is engageable with threaded inner section 230 of the passage, and advancement of screw 238 results in engagement of outer section 242 with the walls of flared outer section 232. Continued advancement of screw 238 results in radially outward expansion of flange sections 236 by engagement of outwardly flared outer section 242 with flared outer end sections 232, to provide a frictional engagement of shaft end section 226 with the surface of bearing assembly 208 defining aperture 212.

In a preferred embodiment, both ends of spindle 78 are secured to bearing assemblies 208 in this manner, for securely mounting spindle 78 to and between head plates 70, 74.

After bearing assemblies 108 and spindle 78 are interconnected in this manner, flexible bearing covers 244 are engaged with the inner spherical aperture, such as 204, 206, defined by head plates 70, 74, respectively, for preventing ingress of dirt or other contaminants into bearing assembly 208 and for preventing accidental contact with the shaft ends.

In assembling a narrow conveyor assembly 20, utilizing frame assembly 22a having a frame section such as 30, the desired length of frame section 30 is cut from a long extrusion, and openings 104, 106 are then formed in the cut frame section a predetermined distance from one end of the frame section. Gear racks 92, 94 are then placed within passages 88, 90, respectively, and bearings 102 and pinion 100 are installed as illustrated in FIG. 6. Bed plate 32 is then cut to length, and openings 50, 52 formed at the predetermined locations along the length of bed plate 32. Bed plate 32 is then mounted to frame section 30 using screws 48 as described previously, by turning screws 48 into slots 44, 46.

Retainer members 58, 60 are then placed into T-slots 54, 56, respectively, and head plates 70, 74 are connected to retainer members 58, 60, respectively, using screws 72, 76, respectively. The connection of head plates 70, 74 to retainer members 58, 60, respectively, is maintained loose, so as to enable axial movement of head plates 70, 74 relative to side frame members 34, 36, respectively. Prior to engagement of head plates 70, 74, spindles 78 and 79 are secured to and between head plates 70, 74 using bearing assemblies 208 and the bearing mounting arrangements as illustrated in FIGS. 9–15.

Conveyor belt 28 is then installed such that the rib 80 of conveyor belt 28 is received within groove 82 and the spindle grooves, such as 84. Pinion 100 is then turned using a tool such as an allen wrench, to extend gear racks 92, 94, as described previously. The ends of gear racks 92, 94 engage ears 198, 200, respectively, to move head plates 70, 74 outwardly relative to frame assembly 22a. Once the desired tension in belt 28 has been attained, the user tightens screws 72, 76 so as to clamp head plates 70, 74 in position relative to frame assembly 22a via retainer members 58, 60 and T-slots 54, 56, respectively.

At the inner end of each gear rack 92, 94, one or more teeth of gear racks 92, 94 are deformed so as to prevent engagement with the teeth of pinion 100 when the deformed teeth are encountered upon rotation of pinion 100. In this manner, the deformed teeth of gear racks 92, 94 act as stops to prevent advancement of gear racks 92, 94 out of engagement with pinion 100.

During operation, conveyor belt 28 is moved by rotation of drive spindle 79, and engagement of conveyor belt rib 80 within bed plate groove 82 and the spindle grooves, such as 84, maintains proper alignment of conveyor belt 28 with spindles 78 and 79. The self-aligning mounting of bearing assemblies 208 to head plates 70, 74 allows each spindle such as 78, 79 to adjust its angle relative to frame section 30 between head plates 70, 74, to ensure proper belt tracking.

To assemble a wider conveyor, such as illustrated in FIGS. 5 and 6, side frame members 130, 132 are first cut to length from long extrusions, and pinion counterbores and holes are formed a predetermined distance from one end of each side frame section 130, 132 for providing pinion mounting. Cross-members 194 and intermediate rail 194 are cut to length according to the desired frame width and length, from a long length of extrusion. Gear racks 92, 94 are then placed within channels 152, 154, respectively. Pinion 196 is then engaged in the openings in side frame members 130, 132, and engage the teeth of gear racks 92, 94. Intermediate rail 162 is positioned between pinion 196 and the cross-member 194 at the end of conveyor frame assembly opposite pinion 196. Cross-members 194 are then positioned between the ends of side frame members 130, 132, if cross-members 194 are required for the width or load requirements of the conveyor.

Bed plate 156 and lower plate 158 are then cut to length from elongated blanks according to the desired length of the conveyor assembly, and openings such as 159, 160, 161, 190, 192 and 195 are formed in head plate 156 and lower plate 158. Screws 48 are then passed through the openings formed in this manner into engagement with the slot structure as described previously, so as to secure bed plate 156 and lower plate 158 to side frame members 130, 132, cross-members 194 and intermediate rail 162. Retainer members 58, 60 and head plates 70, 72 are installed as described previously, as are spindles 78', 79'. Belt tensioning and tracking is the same as described previously.

It can thus be appreciated that the present invention provides a modular conveyor construction which minimizes the number of parts required to form the conveyor frame, and which provides the ability to readily manufacture conveyor frames of various lengths and widths utilizing a large number of common components. The invention incorporates a number of features providing rapid and simple construction of a conveyor frame, thus reducing overall costs of components and assembly.

Various alternatives and embodiments are contemplated as being within the scope of the following claims particularly pointing out and distinctly claiming the subject matter regarded as the invention.

We claim:

1. A conveyor construction, comprising:
    a frame including at least one structural frame member, wherein the structural frame member includes a pair of spaced apart engagement areas, each of which includes slot-type engagement structure extending substantially entirely throughout the length of the structural frame member, wherein the spaced apart engagement areas define an upwardly facing open area therebetween; a top plate-like support member extending between the spaced apart engagement areas and spanning across the open area, wherein the support member includes spaced mounting portions, each of which is located in the vicinity of one of the engagement areas, wherein the support member defines an upwardly facing support surface; and a plurality of fasteners interconnecting each mounting portion of the support member with the slot-type engagement structure of one of the engagement areas, wherein the slot-type engagement structure is capable of receiving fasteners throughout substantially the entire length of the slot-type engagement structure and wherein engagement of the fasteners within the slot-type engagement structure secures the support member to and between the engagement areas;
    at least one spindle extending between and rotatably interconnected with a pair of spindle mounting members, wherein the spindle mounting members are movably engaged with the frame for providing movement of the spindle relative to the frame;
    a pair of axially extending passages located one on either side of the frame;
    an elongated gear rack disposed within each passage, wherein each gear rack is axially movable within the passage and is engageable with one of the spindle mounting members;
    a rotatable pinion drivingly engaged with each gear rack, wherein the pinion extends through the open area defined between the spaced apart engagement areas, wherein rotation of the spindle causes movement of the gear racks within the passages to provide movement of the spindle relative to the frame;
    wherein the spindle is interconnected with the spindle mounting members via a rotatable bearing interposed between each spindle mounting member and a shaft portion defined by the spindle, wherein the shaft portion of the spindle extends through an aperture defined by an inner wall associated with the bearing, wherein each shaft portion includes a passage which extends along an axis non-perpendicular to a longitudinal axis of the shaft portion, and further comprising an engagement member engaged within the passage, wherein the engagement member is operable to force at least a portion of the shaft portion against the inner wall of the bearing to frictionally engage the shaft portion with the bearing.

2. A conveyor frame construction, comprising:
    a pair of side frame members formed integrally with each other, wherein the side frame members define upper areas spaced apart from each other and which cooperate to define an upwardly facing recess, wherein each side frame member defines an upwardly facing engagement area;
    a bottom wall member integrally formed with the pair of side frame members and extending therebetween and underlying the upwardly facing recess; and
    a top plate-like support member interconnected with the side frame members, wherein the support member is constructed to overlie the recess and defines an upwardly facing support surface adapted to support an upper run of a conveyor belt adapted for mounting to the conveyor frame construction, wherein the support member includes spaced apart mounting areas, each of which overlies one of the upwardly facing engagement areas, wherein the support member is interconnected with the side frame members by means of axially extending slot-type engagement structure opening onto each engagement area, and a plurality of fasteners engaged with each mounting area of the support member and extending into the slot-type engagement structure.

3. A conveyor frame construction, comprising:
    a pair of side frame members formed integrally with each other, wherein the side frame members define upper areas spaced apart from each other and which cooperate to define an upwardly facing recess;

a bottom wall member integrally formed with the pair of side frame members and extending therebetween and underlying the upwardly facing recess;

a top plate-like support member interconnected with the side frame members, wherein the support member is constructed to overlie the recess and defines an upwardly facing support surface adapted to support an upper run of a conveyor belt adapted for mounting to the conveyor frame construction; and a rotatable spindle member movably engaged with the conveyor frame construction, and further comprising a pair of gear racks, each of which is movably mounted within an axially extending passage formed in one of the pair of side frame members, and a pinion rotatably mounted to and between the pair of side frame members, wherein the pinion is engaged with each gear rack such that rotation of the pinion results in movement of the gear racks and thereby movement of the spindle relative to the frame construction.

4. The conveyor frame construction of claim 3, wherein the pinion is located within the upwardly facing recess and wherein the pinion is engaged with each gear rack by means of an opening formed in one of the side frame members which establishes communication with the passage.

5. A conveyor construction, comprising:

a pair of separate, spaced apart side frame members;

a top member interconnected with and extending between the side frame members, wherein the top member defines an upwardly facing support surface;

a bottom member interconnected with and extending between the side frame members, wherein the side frame members and the top and bottom members cooperate to define an internal cavity;

an intermediate rail located between the pair of side frame members within the internal cavity, wherein the top and bottom members are interconnected with the intermediate rail; and a conveyor belt engaged with the frame assembly, wherein the conveyor belt defines an upper run located exteriorly of the internal cavity and engaged with a support surface defined by the top member, and a lower run located exteriorly of the internal cavity, wherein the top and bottom members are located between the upper and lower runs of the conveyor belt.

6. The conveyor construction of claim 5, wherein each side frame member defines an upwardly facing engagement area and wherein the top member includes spaced apart mounting areas, each of which overlies the engagement area of one of the side frame members.

7. The conveyor construction of claim 6, wherein each side frame member defines axially extending slot-type engagement structure extending substantially throughout the entirety of its length and opening onto the upwardly facing engagement area, and further comprising a plurality of fasteners which extend through each mounting area into the slot-type engagement structure for securing the top member to and between the pair of side frame members.

8. The conveyor construction of claim 7, wherein each side frame member further includes a downwardly facing engagement area and wherein the bottom member includes spaced apart mounting areas, each of which is engaged with one of the downwardly facing engagement areas.

9. The conveyor construction of claim 8, further comprising downwardly facing slot-type engagement structure formed in each side frame member and extending substantially throughout the entire length of the side frame member, and wherein the bottom member is interconnected with each side frame member by means of a plurality of fasteners which extend through the bottom member and into the downwardly facing slot-type engagement structure.

10. The conveyor construction of claim 8, further comprising a spindle movably mounted to the side frame members, and a spindle position adjustment arrangement including a pair of gear racks, each of which is located within a passage associated with one of the side frame members, and a pinion rotatably mounted to and between the pair of side frame members and engaged with the pair of gear racks.

11. The conveyor construction of claim 10, wherein the passage associated with each side frame member is defined by wall structure forming a part of the side frame member, in combination with a portion of one of the mounting areas of the bottom member.

12. The conveyor construction of claim 10, wherein the pinion is engaged with each gear rack through an opening formed in the side frame member in communication with the passage.

13. The conveyor construction of claim 6, wherein the intermediate rail defines an engagement area within which slot-type engagement structure is formed extending throughout substantially the entire length of the intermediate rail, and further comprising one or more fasteners which extend through one of the top and bottom members and into engagement with the slot-type engagement structure for securing the intermediate rail thereto.

14. The conveyor construction of claim 13, wherein the intermediate rail includes upwardly facing and downwardly facing engagement areas, each of which includes slot-type engagement structure, and wherein both the top member and the bottom member are interconnected with the intermediate rail via one or more fasteners extending therethrough and into engagement with the upwardly and downwardly facing slot-type engagement structure.

15. A bearing mounting arrangement for a conveyor including a frame, a belt and a spindle rotatably mounted to the frame and with which the belt is engaged, wherein the spindle includes an axially extending shaft portion and wherein the shaft portion extends through an aperture defined by an inner wall associated with the bearing, comprising a passage formed in the shaft portion, wherein the passage extends along an axis non-perpendicular to the longitudinal axis of the shaft portion, and an engagement member engaged within the passage, wherein the engagement member is operable to force the shaft portion against the inner wall of the bearing to frictionally engage the shaft portion with the bearing.

16. The bearing mounting arrangement of claim 15, wherein the passage and the engagement member include mating threads for enabling advancement of the engagement member within the passage.

17. The bearing mounting arrangement of claim 16, wherein the passage extends along an axis substantially parallel to the longitudinal axis of the shaft portion and opens onto an end surface defined by the shaft portion.

18. The bearing mounting arrangement of claim 17, wherein the engagement member includes an outwardly tapered head section and wherein the shaft portion includes a radially expandable end section, wherein advancement of the engagement member within the passage causes engagement of the tapered head section with the radially expandable end section so as to expand the end section outwardly into engagement with the inner wall of the bearing.

19. The bearing mounting arrangement of claim 18, wherein the radially expandable end section comprises a split end section of the shaft portion located within the aperture defined by the inner wall associated with the bearing.

20. A bearing mounting arrangement for a conveyor including a frame, a belt and a spindle rotatably mounted to the frame and with which the belt is engaged, wherein the spindle includes an axially extending shaft portion and wherein the shaft portion extends trough an aperture defined by an inner wall associated with the bearing, comprising:

a passage formed in the shaft portion, wherein the passage extends along an axis oriented at an acute angle relative to the longitudinal axis of the shaft portion and opens onto a side surface defined by the shaft portion; and an engagement member engaged within the passage, wherein the passage and the engagement member include mating threads for enabling advancement of the engagement member within the passage to force the shaft portion against the inner wall of the bearing to frictionally engage the shaft portion wit the inner wall of the bearing.

21. The bearing mounting arrangement of claim 20, wherein the passage defines an entrance located outwardly of a side area defined by the bearing for providing access to the passage, and extends through the transverse dimension of the shaft portion and opens opposite the entrance at a location within the aperture defined by the bearing, wherein the engagement member is adapted to be advanced through the passage from the entrance into engagement with the inner wall of the bearing to force an area of the shaft portion adjacent the entrance into frictional engagement with the inner wall of the bearing.

22. The bearing mounting arrangement of claim 21, wherein the shaft portion defines an extension extending outwardly of the entrance to the passage.

23. An adjustment arrangement for a conveyor construction including a frame assembly, at least one spindle and a conveyor belt engaged with the spindle, for adjusting the position of the spindle relative to the frame assembly to impart tension to the conveyor belt, wherein the frame assembly includes a pair of spaced apart side frame members, comprising:

axially extending passage associated with each side frame member;

an elongated gear rack disposed within each passage, wherein each gear rack is axially movable within the passage and is operatively associated with the spindle such that axial movement of the gear rack causes axial movement of the spindle; and a rotatable pinion drivingly engaged with each gear rack, wherein the pinion is rotatably mounted to and extends between the pair of spaced apart side frame members.

24. The adjustment arrangement of claim 23, wherein the passage is formed by a series of walls formed integrally with each side frame member.

25. The adjustment arrangement of claim 24, wherein the pair of side frame members are formed integrally with each other and with a transverse wall which extends between and interconnects the pair of side frame members, wherein one of the walls defining the passage is provided on the transverse wall.

26. The adjustment arrangement of claim 24, wherein the side frame members are separate from each other and are interconnected by a transverse member extending therebetween, and wherein the passage is formed at least in part by one or more walls of the side frame member in combination with a surface of the transverse member.

27. The adjustment arrangement of claim 26, further comprising connector structure interposed between the transverse member and each side frame member for interconnecting the transverse member and the side frame members.

28. The adjustment arrangement of claim 27, wherein the connector structure includes an axially extending slot formed in each side frame member and extending substantially throughout the length of the side frame member, and a plurality of fasteners extending through the transverse member and into the slot.

29. The adjustment arrangement of claim 23, wherein the passage is defined at least in part by a series of walls forming a part of each side frame member, and wherein the pinion is drivingly engaged with each gear rack through an opening in at least one of the walls which is in communication with the passage.

30. The adjustment arrangement of claim 29, further comprising a pair of bearing members with which the pinion is engaged, wherein the bearing members are mounted to the frame assembly for rotatably mounting the pinion to the frame assembly.

31. The adjustment arrangement of claim 29, wherein at least one of the side frame members defines an outwardly facing wall, wherein an opening is formed in the outwardly facing wall to provide access to the pinion.

32. The adjustment arrangement of claim 31, wherein an end of the pinion which is accessible through the opening in the outwardly facing wall includes engagement structure adapted to be engaged by an engagement tool for imparting rotation to the pinion member.

33. A conveyor construction, comprising:

a pair of separate, spaced apart side frame members;

a top member interconnected with and extending between the side frame members, wherein the top member defines an upwardly facing support surface;

a bottom member interconnected with and extending between the side frame members;

an upwardly facing axially extending slot-type structure and a downwardly facing axially extending slot-type engagement structure formed in each side frame member, wherein the slot-type engagement structures each extend substantially throughout the entire length of the side frame member; and wherein both of the top and bottom members are mounted to the side frame members via a plurality of fasteners which extend therethrough and into engagement with one of the slot-type engagement structures.

34. A method of making a conveyor frame, comprising the steps of:

providing a pair of spaced apart structural frame members that define an open area therebetween, wherein the structural frame members each have a length selected according to a desired length of the conveyor frame, and wherein each of the structural frame members includes upwardly facing slot-type engagement structure and downwardly facing slot-type engagement structure each extending substantially entirely throughout the length of the structural frame member; and locating an upper transverse member and a lower transverse member between the spaced apart structural frame members, wherein the transverse members span across the open area and include spaced mounting portions, each of which is aligned with one of the slot-type engagement structures; and securing the upper and lower transverse members to the structural frame members by engaging a plurality of fasteners with each mounting portion of the upper and lower transverse members and into the upwardly and downwardly facing slot-type engagement structure of each structural frame member, wherein the slot-type engagement structure is capable of receiving fasteners throughout substantially the entire length of the structural frame member and wherein engagement of the fasteners within the slot-type engagement structures secure the upper and lower transverse members to and between the structural frame members.

* * * * *

UNITED STATES PATENT AND TRADEMARK OFFICE
CERTIFICATE OF CORRECTION

PATENT NO. : 6,422,382 B1
DATED : July 23, 2002
INVENTOR(S) : Daniel E. Ertel, Scott M. Hall and Michael A. Hosch It is certified that error appears in the above-identified patent and that said Letters Patent is hereby corrected as shown below:

Column 15,
Line 10, after "extends" delete "trough" and insert -- through --.
Line 21, after "portion" delete "wit" and insert -- with --.

Signed and Sealed this

Third Day of December, 2002

JAMES E. ROGAN
*Director of the United States Patent and Trademark Office*